US011407060B2

(12) United States Patent
Werz et al.

(10) Patent No.: US 11,407,060 B2
(45) Date of Patent: Aug. 9, 2022

(54) COUNTER SUPPORT, DEVICE AND METHOD FOR FRICTION STIR WELDING

(71) Applicant: Universitaet Stuttgart, Stuttgart (DE)

(72) Inventors: Martin Werz, Dettingen (DE); Stefan Weihe, Buxheim (DE); Florian Panzer, Fellbach (DE)

(73) Assignee: UNIVERSITAET STUTTGART, Stuttgart (DE)

(*) Notice: Subject to any disclaimer, the term of this patent is extended or adjusted under 35 U.S.C. 154(b) by 168 days.

(21) Appl. No.: 16/411,362

(22) Filed: May 14, 2019

(65) Prior Publication Data

US 2020/0016686 A1 Jan. 16, 2020

(30) Foreign Application Priority Data

May 14, 2018 (DE) ........................ 1020181110496.6

(51) Int. Cl.
*B23K 20/00* (2006.01)
*B23K 20/12* (2006.01)

(52) U.S. Cl.
CPC ................................ *B23K 20/126* (2013.01)

(58) Field of Classification Search
CPC .... B23K 20/122; B23K 20/129; B23K 20/12; B23K 20/1245; B23K 20/123; B23K 20/127
See application file for complete search history.

(56) References Cited

U.S. PATENT DOCUMENTS

| 6,484,924 | B1 * | 11/2002 | Forrest | B23K 20/126 228/103 |
| 7,210,610 | B2 * | 5/2007 | Nelson | B23K 20/126 228/112.1 |
| 8,033,443 | B1 | 10/2011 | Sigler et al. | |
| 9,073,148 | B2 * | 7/2015 | Kato | B23K 20/1265 |
| 9,517,529 | B2 * | 12/2016 | Mialhe | B23K 20/1255 |
| 9,975,200 | B2 * | 5/2018 | Nishida | B23K 37/0294 |
| 2013/0206817 | A1 | 8/2013 | Tavares et al. | |
| 2017/0120373 | A1 | 5/2017 | Poncelet et al. | |

FOREIGN PATENT DOCUMENTS

| CN | 1623763 A | 6/2005 |
| CN | 2754798 Y | 2/2006 |
| CN | 103097072 A | 5/2013 |
| CN | 204893205 U | 12/2015 |
| CN | 105312761 A | 2/2016 |
| DE | 102010027291 A1 | 1/2012 |
| JP | 2000202646 A | 7/2000 |
| JP | 2013202629 A | 10/2013 |

(Continued)

OTHER PUBLICATIONS

English Abstract of CN105312761A.
(Continued)

*Primary Examiner* — Erin B Saad
(74) *Attorney, Agent, or Firm* — Ware, Fressola, Maguire & Barber LLP

(57) ABSTRACT

A counter support for friction stir welding, which makes it possible to also produce very long weld seams by friction stir welding despite a very compact design, is shown. Curved components and nn-straight weld seams may also be produced.

8 Claims, 8 Drawing Sheets

(56) References Cited

FOREIGN PATENT DOCUMENTS

Figure 1:
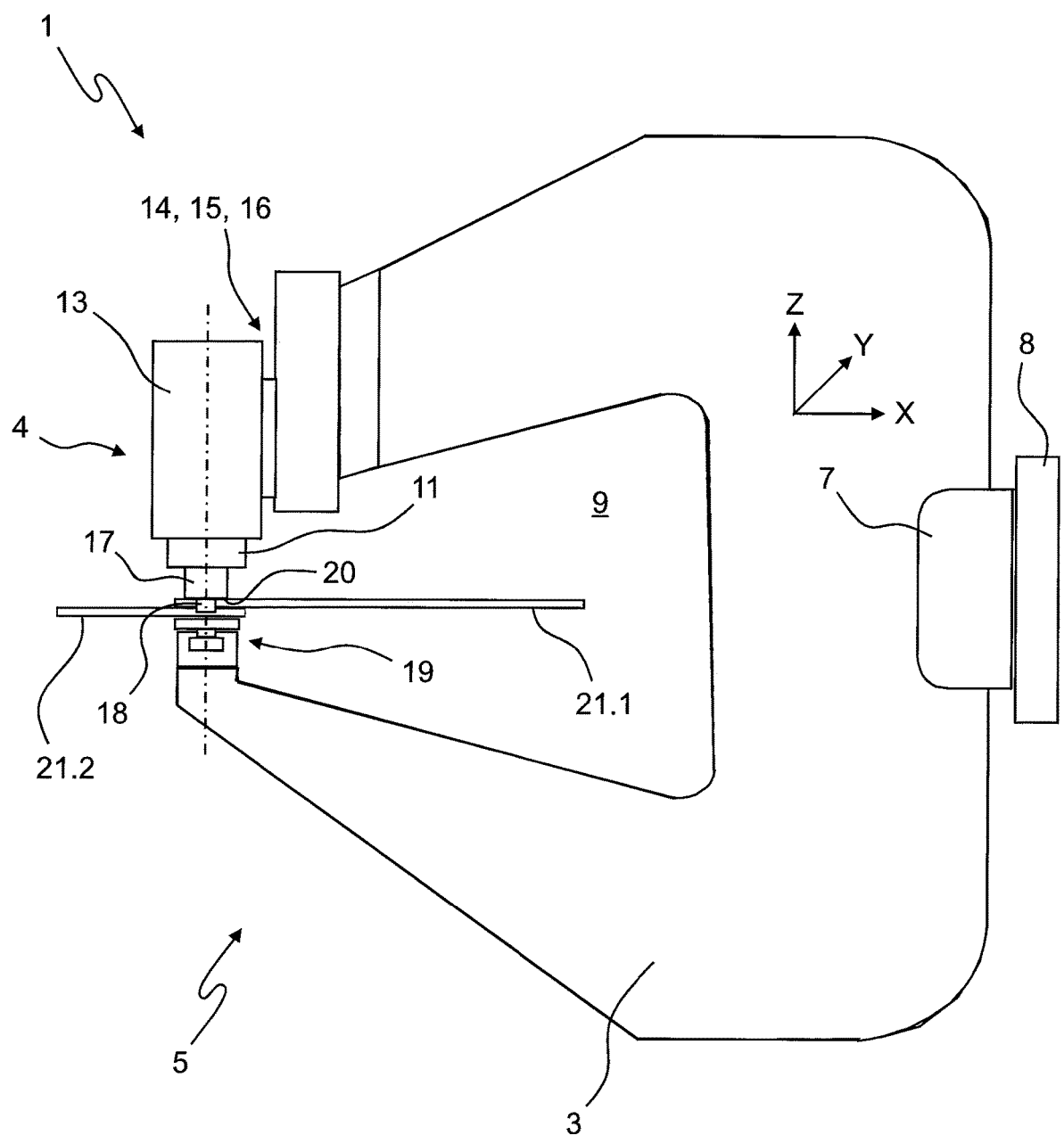

KR    20120061229 A    6/2012
WO     2009015789 A1    2/2009

OTHER PUBLICATIONS

English Abstract of CN2754798Y.
English Abstract of JP2000202646A.
English Abstract of CN1623763A.
English Abstract of CN204893205U.
English Abstract of JP2013202629A.
English Abstract of KR20120061229A.
English Abstract of CN103097072A.
US2013/0206817 (English language) for DE102010027291.
English language Abstract for WO2009015789.

* cited by examiner

COUNTER SUPPORT, DEVICE AND METHOD FOR FRICTION STIR WELDING

With the friction stir welding invented at the TWI in 1991, especially flat components can be joined without fusing them. When selecting the welding parameters correctly, this leads to high-strength welded connections and very low warpage of the joined components.

A further advantage of friction stir welding is that materials having different melting temperatures can also be connected in the solid state, and the formation of brittle and strength-reducing intermetallic phases can be avoided in the process.

However, one disadvantage of friction stir welding is the high process forces (infeed force and feed force). In most applications, this results in the need to provide a counter support with melt pool support, which absorbs the forces, on the side of the component opposite the tool for friction stir welding. The counter support and the melt pool support must be adapted to the geometry of the components to be joined.

Especially in the case of components with a curved surface, or in the case of weld seam contours deviating even slightly from a straight line, the geometry of the required counter support can become complex. Particularly in the case of long seams and when connecting large parts, such as, for example, when assembling an automotive body, large and thus very expensive counter support designs are required. The associated 5-axis friction stir welding machines are also very large and very expensive.

From an economic point of view, using the friction stir welding process to join large and curved components with a long and continuous weld seam cannot be realized today for this reason.

A device for friction stir welding in which a pin is accommodated in a spindle and is driven by it is known from DE 10 2010 027 291 A1. On the side opposite the spindle, a slide into which the rotating pin dips is provided. The components to be joined are supported on the slide.

In case of the solution known from US 2017/0120373 A1, a roller rotating perpendicularly to the direction of rotation of the tool is used as the counter support. The force flow inside the friction stir welding tongs is closed as a result; however, this has the disadvantage that the roller must have a very large diameter in order to be able to serve as the counter support for a flat or only moderately curved metal sheet or component.

Another approach to a solution is known from U.S. Pat. No. 8,033,443 B1. In this case, a miniaturized caterpillar track is proposed as the counter support. With this solution, material can penetrate between the individual track shoes so that they become sluggish and must be cleaned. The material which possibly penetrates between the segments leads to a very poor surface quality on the underside of the weld seam. Moreover, mounting the individual shoes of the caterpillar track is complex or leads to a correspondingly high degree of friction.

With such counter supports, long weld seams are produced in a friction stir welding process.

The invention is based on the object of providing a counter support, a device and a method for friction stir welding which avoid the disadvantages of the prior art. The cost-effective joining of long and/or curved components is to be made possible in particular.

The welding device or the method must be robust so that a high number of welding processes can be performed before maintenance, cleaning or repair becomes necessary. Furthermore, the welding device must be designed so compactly that the device does not collide or overlap with the components to be joined or other holding devices.

This object is achieved according to the invention by a counter support according to claim 1, a device according to claim 14, and the method according to the invention according to claim 19.

The counter support according to the invention makes it possible to produce short stitch seams and to produce the desired long weld seam from a plurality of contiguous stitch seams. This method has the following advantages, among others:

The counter support according to the invention is of a very compact design. Among other things, it can therefore be produced relatively inexpensively.

It does not have to be manufactured for each component individually. Rather, a counter support can be used to join a plurality of differently shaped components.

A long, curved or curvilinear weld seam is thus approximated or realized by a polygonal line of short, preferably straight, merging weld seams.

With the counter support according to the invention, the melt pool support must only be approximately as long as or slightly longer than a (relatively) short stitch weld seam in the feed direction; this results in a very compact design. Nevertheless, an arbitrarily long straight or curved weld seam can be produced by seamlessly joining a plurality of short stitch weld seams.

The length of a single short weld seam or the length of the melt pool support used for it and its length of movement are substantially smaller than the main dimensions of the workpiece(s) to be joined. The length of movement of the melt pool support and thus the weld seam length can, for example, be at most one tenth, in particular at most one hundredth, in particular one thousandth of the main dimension of the larger workpiece to be joined. Depending on the size of the component, the length of movement of the counter support when performing a stitch seam is in particular at most 20 cm, at most 5 cm, at most 2 cm, and at most 5 mm.

The counter support according to the invention comprises a base part and a melt pool support, wherein guide means with at least one degree of freedom are arranged between the melt pool support and the base part, which guide means enable a melt pool support movement which is limited by two end positions and is relative to the base part.

Within the meaning of the invention, a movement along a straight or a curved line is understood as a movement with one degree of freedom. A preferred curved line is a circular segment. Given that the movement of the melt pool support is limited according to the invention by two end positions, the melt pool support of the counter support according to the invention can travel either a straight path between the two end positions or a circular segment between two end positions. The melt pool support according to the invention cannot travel a closed circle, because its movement is limited by two end positions. In practice, it has often been found to be sufficient for the circular segment to be at most one eighth, one tenth, or one twelfth of a circle (45°, 36°, 30°, 20°, or 10°). In an advantageous embodiment of the invention, the slide can move along a straight line or along a curved line, preferably along a circular path, between the first and the second end position.

Alternatively, it is also possible for the guide means to comprise a base part and a control lever, wherein the control lever is rotatably mounted on the base part by means of a bearing, wherein the melt pool support is arranged at an end opposite the bearing and the melt pool support has a curved contour, in particular a circular arc-shaped or involute-shaped contour. With this embodiment of a guide means, the control lever and with it the melt pool support are pivoted about the bearing. Here as well, the pivoting movement of the control lever is limited by two end positions. The melt pool support, which is located at an end of the control lever opposite the bearing, accordingly makes a circular movement between the end positions. The contour can be a circular contour in particular. In this case, the center point of the circular contour and the pivot point of the control lever do not have to coincide. This results in the possibility of "generating" a portion of the feed force required for the joining from the infeed force which is already present.

The counter support is of a very simple design and is extremely robust.

In a further advantageous embodiment, the guide means can comprise an upper part and two or more control levers arranged in parallel to one another. The control levers are mounted at a first end in the base part, and the upper part is rotatably mounted at a second end of the control lever. The melt pool support is in turn arranged on the upper part. Here as well, the melt pool support makes a circular arc-shaped movement when the melt pool support moves from the first end position to the second end position. A very elegant form in terms of manufacturing technology provides that the base part, control lever and upper part are produced from one piece. The bearings between the control levers and the base part or the upper part can then be designed as flexure hinges. The relative movement between the upper part and the base part ultimately takes place as a result of the elasticity of the components. The path the upper part can travel relatively to the base part must be limited such that a permanent deformation of the control lever does not occur. In order to ensure this reliably, two stop points defining the end positions can also effectively limit the relative movement of the upper part to the base part in this exemplary embodiment.

It has proved to be advantageous if a length L of the melt pool support is larger than or approximately equal to a distance S of the two end positions of the melt pool support. This ensures that the component is supported by the melt pool support independently of the position of the melt pool support during the entire movement of the melt pool support from one end position to the other end position.

In a further advantageous embodiment, the counter support according to the invention has restoring means, which bring the melt pool support into a first end position as needed.

In the simplest case, such restoring means can be a return spring. Alternatively, it is also possible to use restoring means that can be actively influenced in order to bring the counter support together with the melt pool support into any desired position between the two end positions.

This drive can also be used at the same time to apply a portion of the feed force.

Especially if the counter support is equipped with a return spring, a locking device, for example in the form of a simple brake, which makes it possible to lock the melt pool support in a predetermined position, for example the first end position, is advantageous. Of course, such brake must also be releasable so that when the actual welding process begins, a relative movement between the melt pool support and the base part of the counter support is possible. Only very small requirements are imposed on this locking device. It is merely to prevent the unwanted "slipping" of the melt pool support, especially during the dipping process of the friction stir welding tool into the components to be welded. It is readily possible for the person skilled in the art to find a suitable constructive solution for such a locking device if necessary.

In principle, an appropriately preloaded spring, especially in combination with knee lever kinematics, can also serve as the locking device.

Claims 4 to 6 are explained in more detail in connection with FIGS. 3 to 5. By positioning the melt pool support relatively to a feed direction (X axis) of the friction stir welding device, a portion of the quite considerable feed force can be applied during the welding process by redirecting the infeed force (into the X axis).

The infeed force then no longer runs orthogonally to the feed direction. This results in a force component of the infeed force in the feed direction. The magnitude of this force component depends on how much the angle of approach deviates from a right angle. By "using" a force component of the infeed force in the feed direction, the handling device or an industrial robot which has to apply the feed force is relieved of load. The handling device can therefore be dimensioned smaller and is therefore more cost-effective. It can even be completely dispensed with if the workpiece is handled manually.

However, with all of these embodiments, an infeed movement must then take place continuously during the welding process, since the contact force between the tool and the component would otherwise decrease with increasing movement of the melt pool support toward the second end position. In brief, this results in a simplification or the positioning reduces the requirements on an industrial robot. At the same time, controlling the welding process must realize a continuous infeed.

The angle of approach a also has technological reasons in that a small angle of approach in the range of 1° to 3° can improve the quality of the weld seam. It is obvious that such a small inclination only redirects a small portion of the infeed force into a feed force. The exemplary embodiment according to FIG. 5 therefore provides a very distinct inclination between the surface of the melt pool support and the linear guide. This inclination is much larger than the desired angle of approach. In order to ultimately arrive at the desired angle of approach, the base of the counter support is inclined with respect to the feed direction in the opposite direction but with a smaller magnitude so that from the difference of the two wedge angles between the melt pool support and the linear guide on the one hand and the linear guide and the feed direction on the other hand, the desired angle of approach a results.

According to the embodiment according to claim 9, the counter support has a rotating device, wherein the rotating device rotates the melt pool support as needed about an axis, which is at least approximately parallel to the axis of rotation of the tool or orthogonal to the feed direction x, and in other words, the axis of rotation of the rotating device may also run orthogonally to the feed direction x.

The use of the rotating device thus represents an alternative to rotating the entire welding device in order to change the orientation of the counter support in relation to the component if the rotation of the entire welding device is not possible for accessibility reasons.

In this case, the rotating device serves to change the orientation of the counter support between two short stitch seams or to change the associated welding processes relatively to the component or the tongs. This means that the rotating device is not active but blocked during the welding process and therefore does not introduce any energy into the welding process.

This rotating device makes it possible to also produce curved long weld seams by rotating the melt pool support relatively to the workpiece between the welding of two short stitch seams. Since the feed direction and the degree of freedom of the counter support or the melt pool support must run in parallel to one another during the subsequent joining process, the stitch seam which was made after the rotation of the melt pool support ultimately has a different direction than the previously produced stitch seam. As a result, curved weld seams can thus be composed of a series of various short straight stitch seams.

The counter support according to the invention does not have an axis which can be moved transversely to the weld seam as, for example, machine tools have. A positioning movement of the tool relative to the workpiece is carried out completely, or with the aid of at most one axis of the welding device, by the handling system.

The advantages according to the invention are also achieved by a device for friction stir welding according to claims 14 to 18.

The holder of the tool for friction stir welding and the counter support are arranged on opposite sides of the component to be joined. It is now possible to arrange the spindle and the tool for friction stir welding (device for friction stir welding) and the counter support on a frame that is, for example, C-shaped. Such C-shaped frame can have a mechanical interface so that an industrial robot can move this C-shaped frame and with it the device for friction stir welding and the counter support according to the invention relatively to a firmly clamped component.

In the process, the device/frame absorbs all or at least substantial portions of the process forces. The force fit in the infeed direction is absorbed by the device or the frame. A handling system, such as an articulated-arm industrial robot, must therefore essentially absorb only the weight of the device and in some cases the forces which are minor in terms of magnitude and which result from the process forces (at most 30%, in particular at most 10%, of the magnitude of the axial or infeed force) or moments. Small moments can result, for example, from the feed force and possibly the thickness of the workpieces to be welded and from the force introduction point of the device.

During the welding process, the device is moved along the weld seam relatively to the workpiece(s) by means of a handling system. Alternatively, the workpiece can be moved by a handling system relatively to the device during the welding process, or the workpiece can be manually guided by a machine operator.

In a further development, the device has a holder for the component to be joined. In this case, it is provided that the holder can be moved in the feed direction relatively to the spindle and the counter support. It does not matter in this case whether the holder is stationary and the spindle and counter support move during the joining process or whether the spindle and counter support are stationary and the holder and with it the component to be joined are moved relatively during the joining process.

In a preferred embodiment, however, holders or clamps in the area of the device are dispensed with entirely. In this case, the component(s) to be joined are exclusively held by holders or clamps that are connected to the device not statically but only via the handling system (robot).

The advantages according to the invention are further realized by a method according to claim 19. It is based on a counter support according to the invention and composes a long weld seam made of several short stitch seams. It comprises the steps a) to f), which are explained in more detail in connection with FIG. 12.

Tongs or a device are/is used as the welding device so that the force flow of at least the axial force is (at least substantially) closed. Either the tongs are preferably guided by a robot or they are stationary and the component(s) are moved through the tongs by a robot, for example. In contrast to the prior art, the counter support is, in comparison to the component, a short piece which can travel a short distance by means of a guide. The guide can be a linear guide, an arc guide, a surface guide or a rotary guide with one or two degrees of freedom.

The guide for moving the counter support transversely to the axis of rotation of the tool is preferably arranged on the side facing away from the tool. The axial force thus always acts at the same point preferably in the center plane of the tongs. Additional bending moments or torsional moments which would result from a distance of the axial force from the center plane of the tongs can be avoided or reduced by this arrangement. Consequently, a constantly high degree of stiffness almost independent of the position of the counter support arises.

DRAWING

Figure 2:
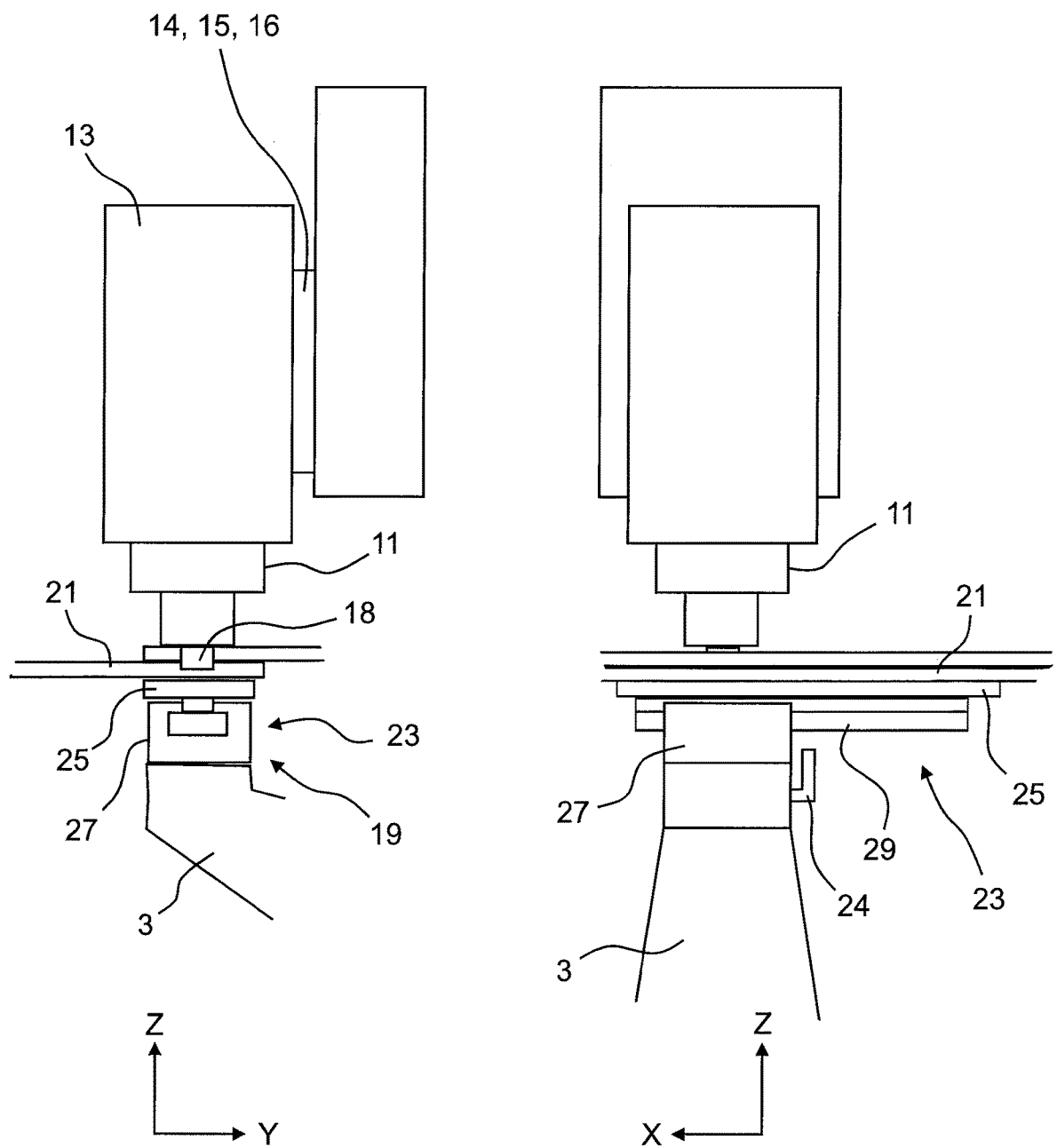
Figure 3:
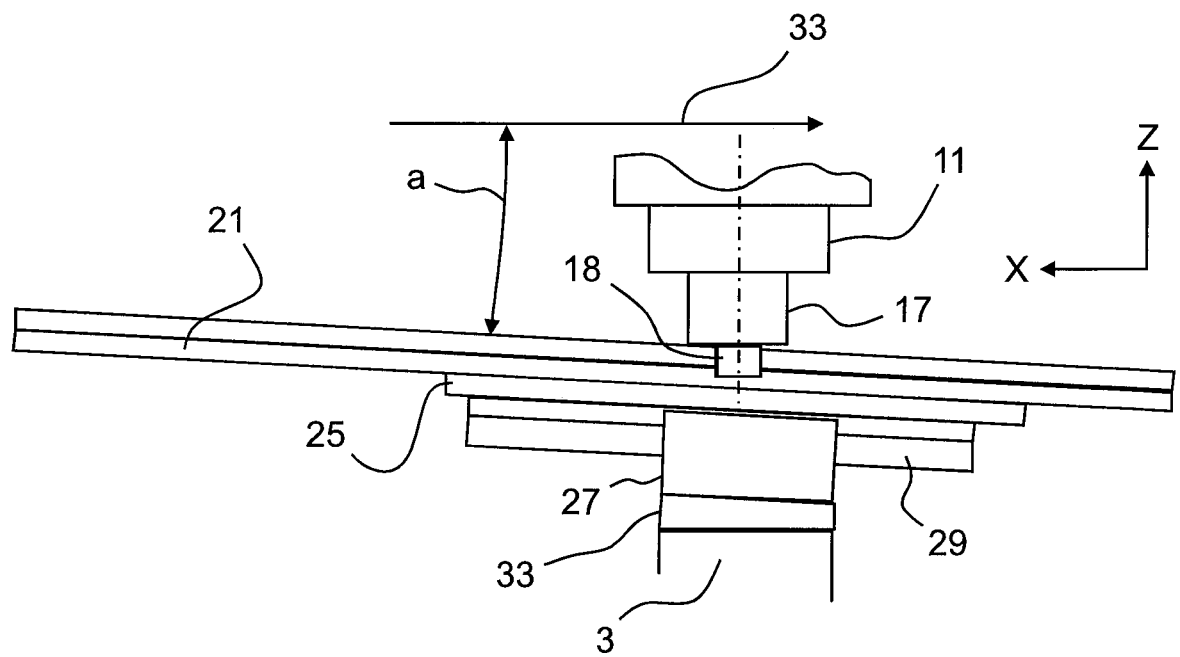
Figure 4:
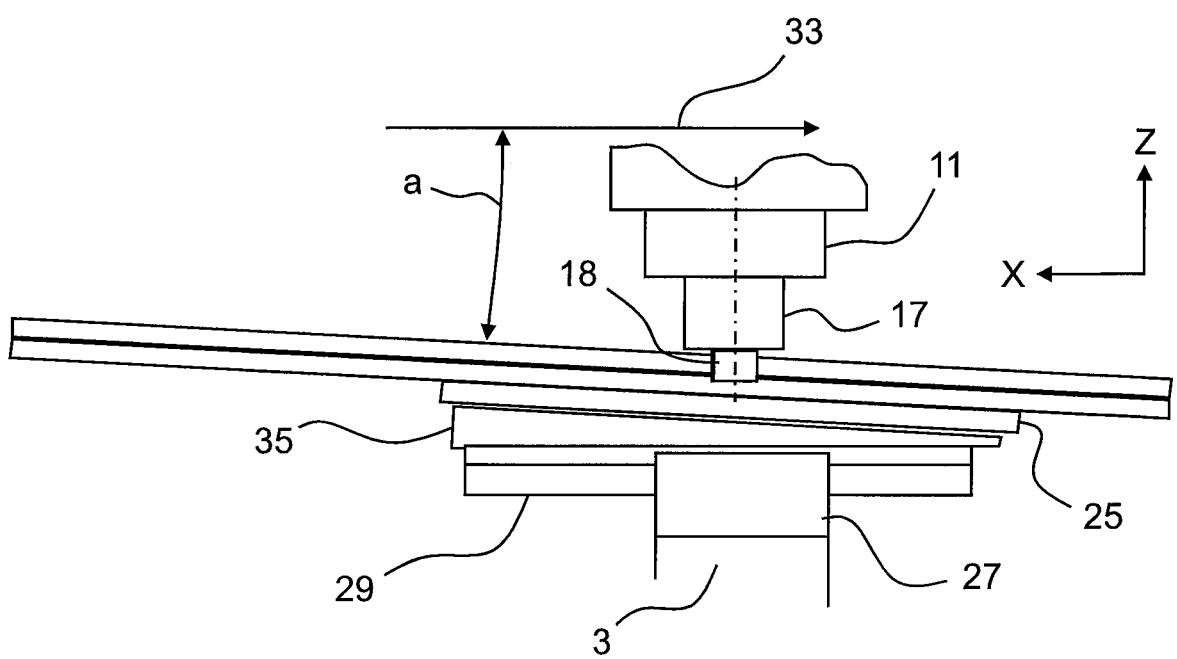
Figure 5:
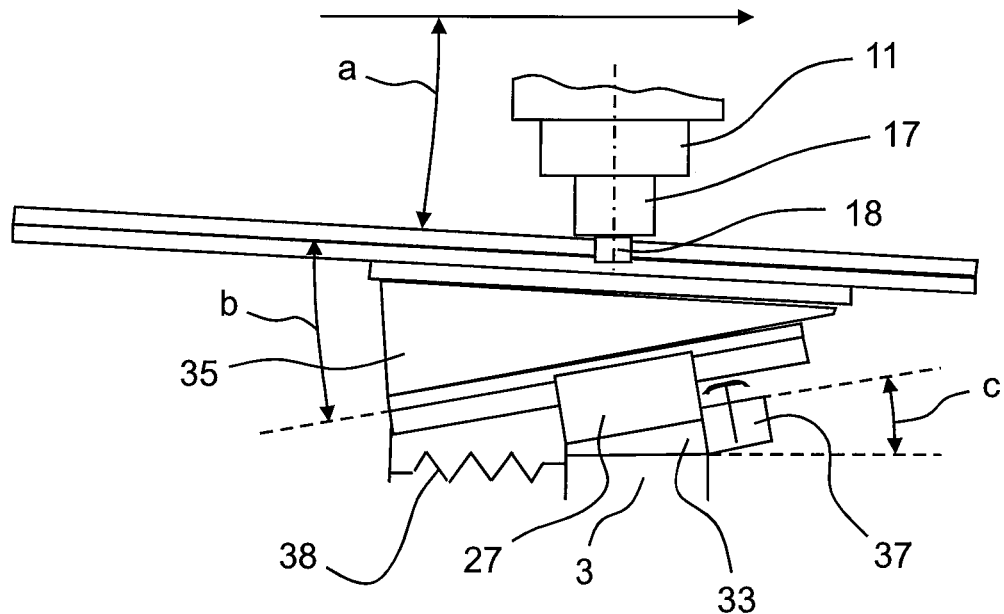
Figure 6:
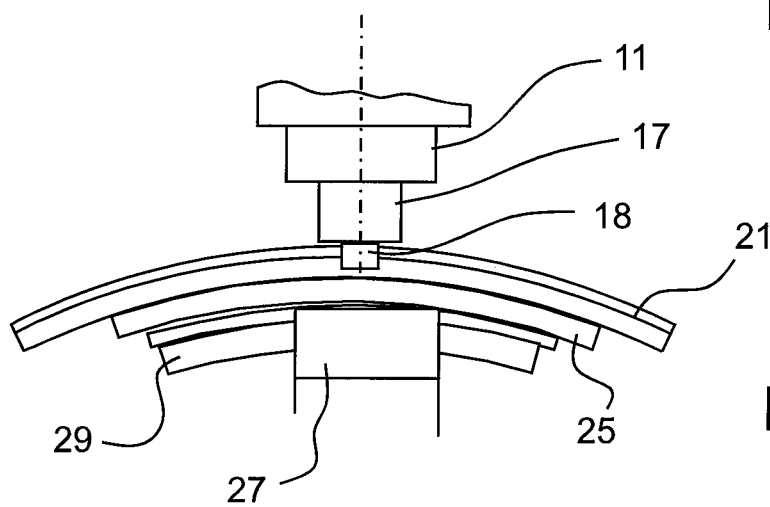
Figure 7:
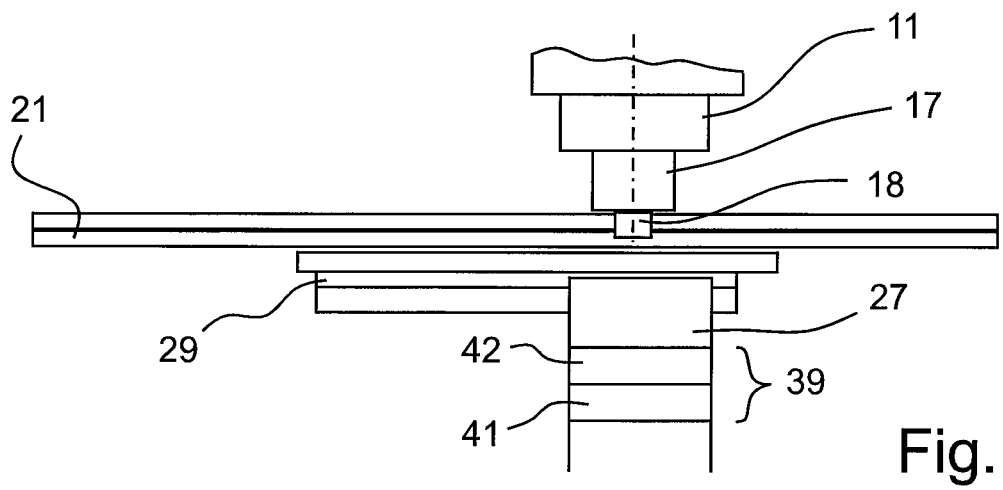
Figure 8:
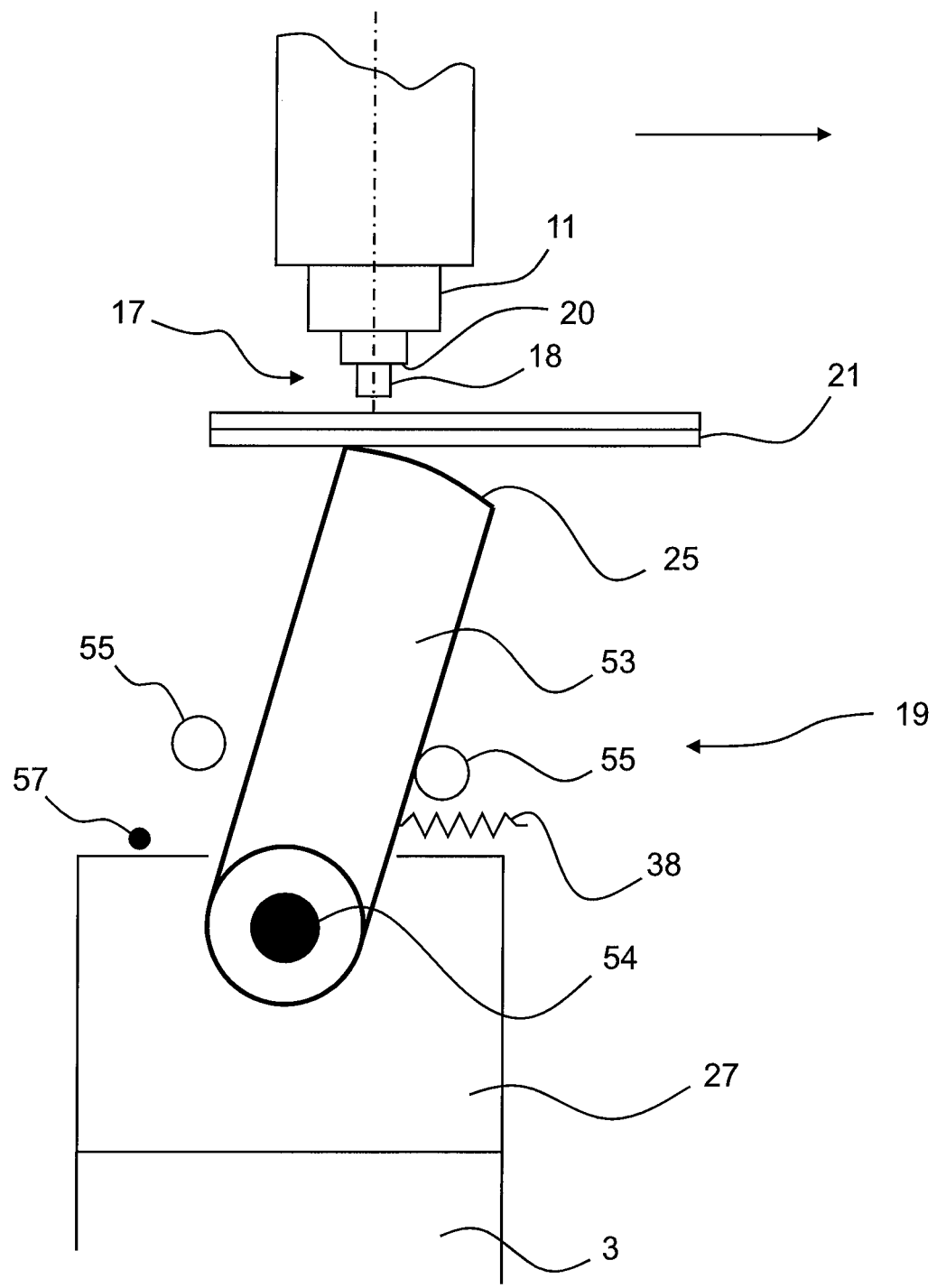
Figure 9:
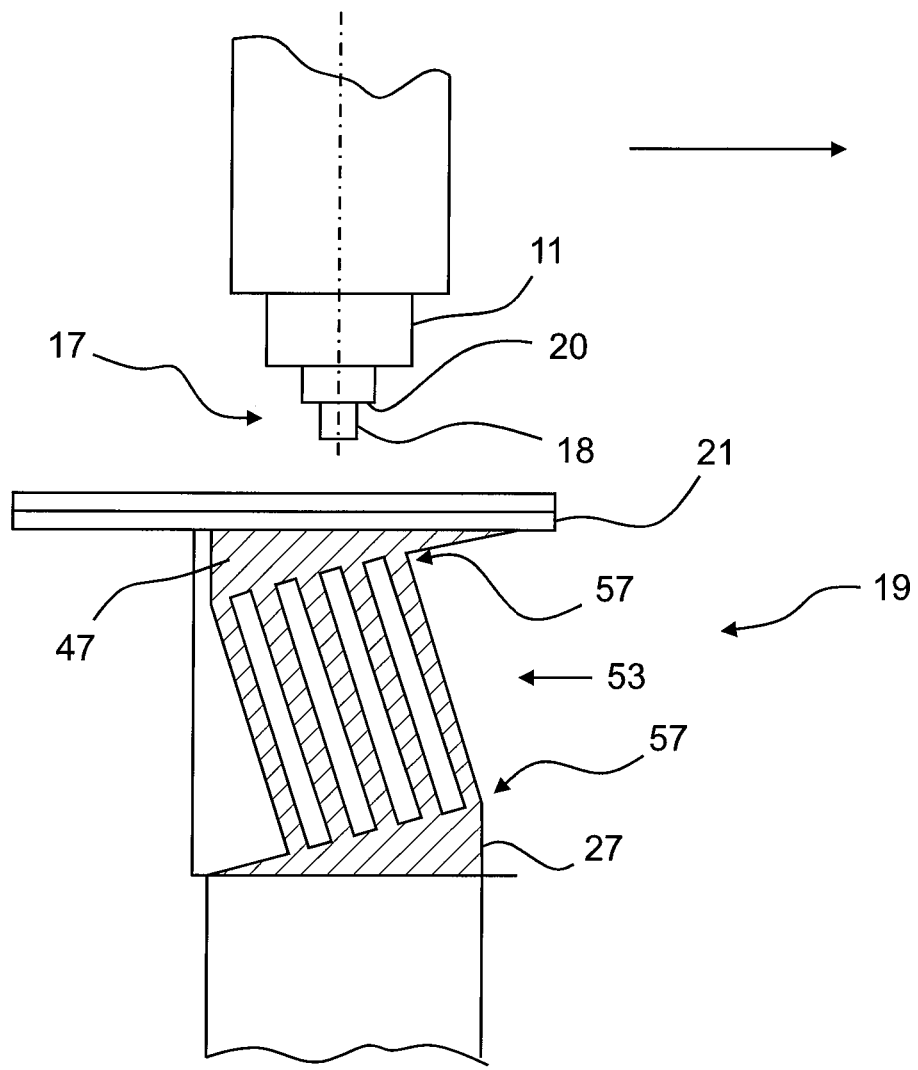
Figure 10:
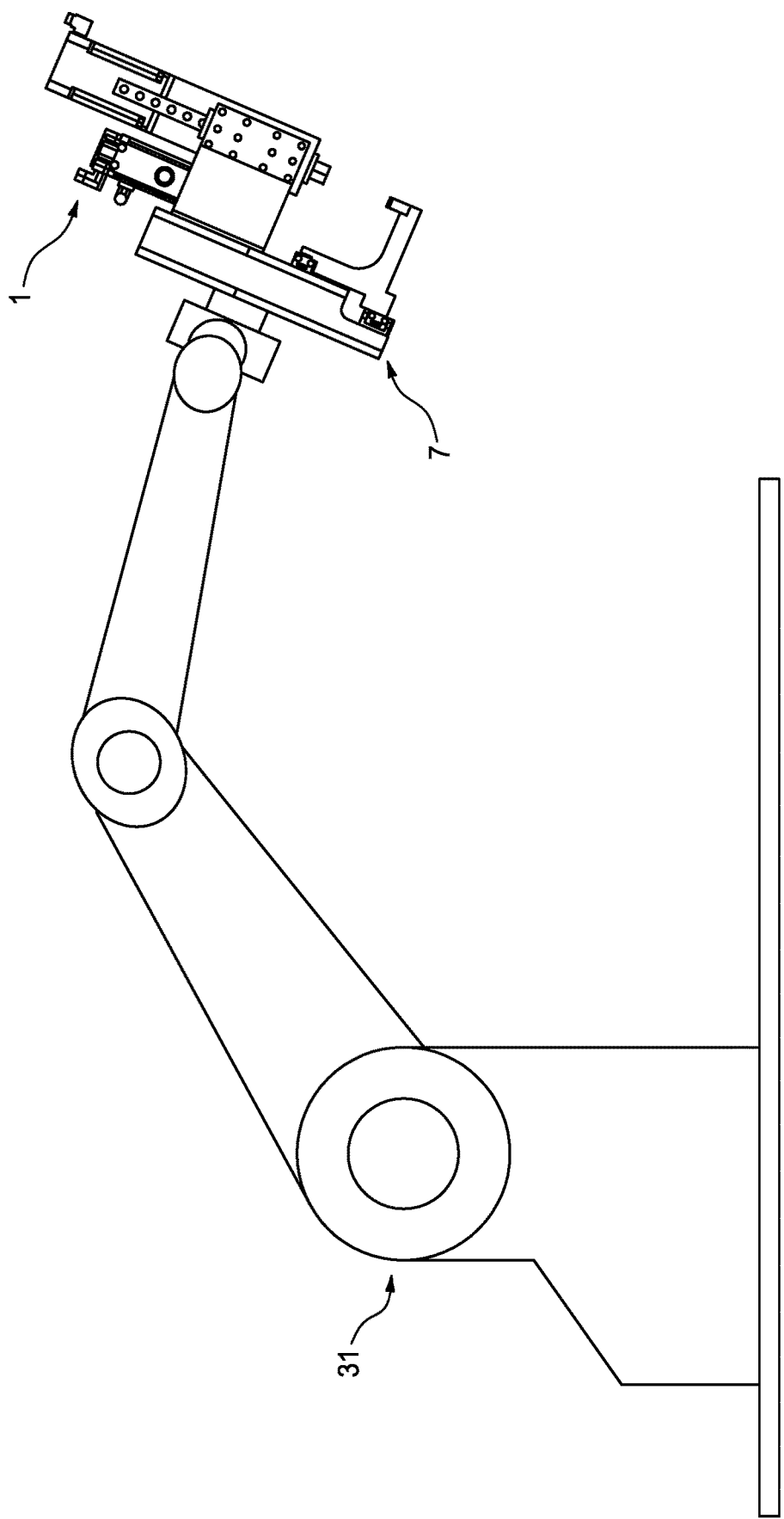
Figure 11:
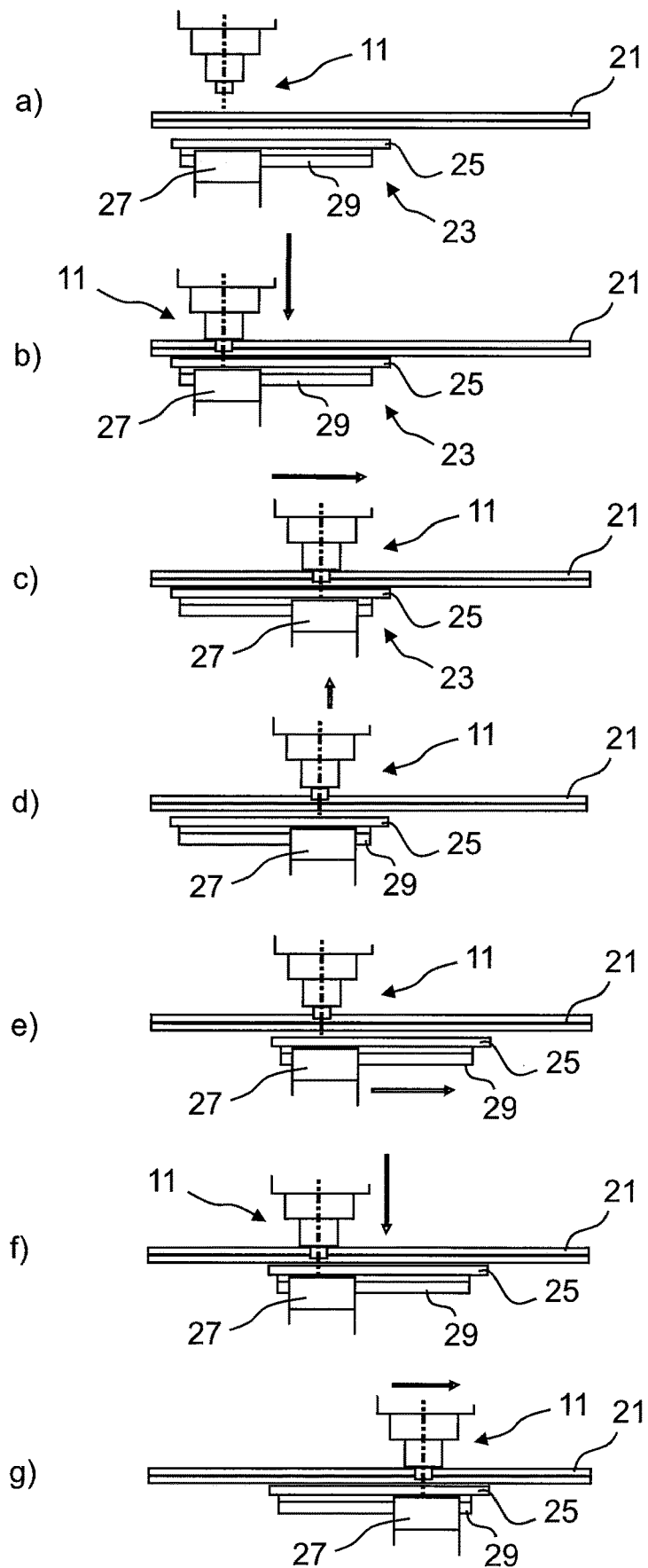

The following are shown:

FIG. 1: a schematic side view of friction stir welding tongs according to the invention;

FIG. 2: a schematic side view and front view of the friction stir welding tongs according to FIG. 1;

FIG. 3: a schematic front view of a first embodiment of friction stir welding tongs according to the invention with an inclined guide slide;

FIG. 4: a schematic front view of a second embodiment of friction stir welding tongs according to the invention with an inclined guide slide;

FIG. 5: a schematic front view of a third embodiment of friction stir welding tongs according to the invention with an inclined guide slide;

FIG. 6: a schematic front view of an embodiment of friction stir welding tongs according to the invention [with] an arc-shaped/curved counter support;

FIG. 7: a schematic front view of an embodiment of friction stir welding tongs according to the invention with a rotating unit between the tongs and the counter support;

FIGS. 8 and 9: additional embodiments of counter supports according to the invention;

FIG. 10: an isometric view of friction stir welding tongs according to the invention arranged on an industrial robot; and FIG. 11: the sequence of an exemplary embodiment of the method according to the invention.

DESCRIPTION OF THE EXEMPLARY EMBODIMENTS

FIG. 1 shows an example of a device for friction stir welding according to the invention, which is designed as welding tongs 1; it is referred to below as tongs 1.

The tongs 1 comprise a C-shaped frame 3 which connects a tool side 4 and a counter-support side 5 such that both sides are opposite each other. The C-shaped frame 3 of the tongs 1 establishes the force fit between the two sides 4 and 5. A free space 9 in the frame 3 is dimensioned such that at least one of the components to be connected is at least partially located therein.

In a preferred embodiment or type of application, the proportions of the component and the tongs are such that the component(s) to be joined project beyond the tongs on at least two sides.

The invention relates primarily to the counter support and less to the components located on the tool side 4. The latter are therefore described only relatively briefly. The frame 3 has a (mechanical) interface 7. Via the interface 7, the tongs 1 are connected to and guided by an industrial robot or another handling system (see FIG. 10). Alternatively, the tongs 1 can also be connected to a holding device via the interface 7 and held in a stationary manner. During the welding process, the component 21 to be joined must then be moved manually or by an industrial robot relatively to the tongs 1 in the feed direction (X axis).

A force measuring device 8 can optionally be located between the interface 7 and the frame 3 or between the interface 7 and the handling system. This force measuring device 8 may be designed to be able to partially or completely measure the forces and moments occurring at this point; as a rule, it is sufficient if three (linearly independent) forces and up to three (linearly independent) moments can be measured. Such force and moment information may and are typically used to control the movement of the robot. The control is preferably to be carried out in such a way that no other stress than the process forces acts on the component to be joined in the infeed direction.

Especially position deviations perpendicular to the joining direction and resulting from the elastic deformation of the handling system or from tolerances can be compensated by a force control.

With an appropriate control, the weight force and the resulting moments of the entire device can also be taken into account.

On the tool side 4, a driven spindle 11 with a tool holder (without a reference symbol), a drive 13 (typically a speed-regulated electric motor) and optionally a first (linear) guide 15 with an actuator are provided.

For determining the forces and the position in the infeed direction, a force measuring sensor 14 and/or a position sensor 16 can be present in the vicinity of the guide 15 with an actuator. Such sensors 14, 16 can be integrated into the guide or the actuator or can be designed as separate units. Their measured values are then used to control and/or regulate the friction stir welding process. The measured values are transmitted to an electronic regulating and/or control device (not shown).

A tool 17 for friction stir welding is accommodated in the spindle 11. The tool 17 comprises a pin 18 which is set in rotation by the spindle 11 or the drive.

The tool 17 further comprises a shoulder 20 which serves as a contact surface of the tool 17 on the component 21 to be joined. In FIG. 11 *a*), the tool 17 is more easily visible. The pin 18 and the tool shoulder 20 can be easily seen there.

The tool 17 may also be designed with a "stationary" (i.e., non-rotating) tool shoulder 20. At that point, only the pin 18 rotates. This results in particularly smooth weld seams.

In a further embodiment, the tool 17 can be designed in several parts in such a way that the length of the projection of the pin 18 beyond the tool shoulder 20 is variable. This can be realized, for example, by an actively controllable actuator, such as a hydraulic cylinder, or a spring. Various sheet metal thicknesses can thus be welded using one tool. A further type of application provides that the length of the projection of the pin 18 beyond the tool shoulder is reduced in the last short weld seam of a polygonal line in order to thus avoid or reduce the end crater occurring during friction stir welding.

The device according to the invention can be combined with multi-part tools 17 for friction stir welding, which are able to absorb the material "displaced" during dipping of the pin 8 into the component 21 at the beginning of the joining process, and/or to completely or partially fill the crater formed during the extension of the pin 18 at the end of the joining process with the previously absorbed material.

The linear guide 15 shown or the associated actuator enables an (infeed) movement of the spindle 11 in the direction of a Z axis, i.e., toward the counter-support side 5 and back.

The linear guide 15 and the associated actuator as well as the measuring devices 14, 16 can also be arranged on the counter-support side 5, and correspondingly move a counter support 19 according to the invention in the direction of the Z axis.

The actuator can be a hydraulic or pneumatic cylinder, a rack and pinion drive, a threaded spindle, a piezo actuator or another suitable linear drive.

The frame 3 may also be designed in two or more parts so that the distance between the spindle 11 or the tool 17 and the counter support 19 can be temporarily enlarged in order to insert or remove a component to be processed.

In the example shown in FIG. 1, the linear guide 15 and the associated actuator provide a sufficient travel path to move the tool 17 or the spindle 11 so far away from the counter support 19 that a component 21 to be welded at least partially passes through. The component to be welded in the example shown consists of two metal sheets 21.1 and 21.2.

In the illustrated exemplary embodiment, the linear guide 15 and the associated actuator are not only used for the above-described "opening" and "closing" of the tongs 1. They are preferably also used to advance the tool 17 during welding so far in the (negative) direction of the Z axis that the rotating tool pin 17 penetrates into the component 21 and the (tool) shoulder 20 rests on the surface of the component 21. The drive also provides the infeed force.

Hydraulic cylinders, pneumatic cylinders, linear motors, ball screws, threaded gears, piezo actuators, etc. can be used as actuators.

FIG. 2 shows a slight enlargement of the spindle 11, the drive 13, the linear guide 15 with an actuator, the tool 17, and the counter support 19 in two views (side view and front view).

In this exemplary embodiment, the counter support 19 comprises guide means in the form of a (second) linear guide 23 and a melt pool support 25. The melt pool support 25 supports the component 21 and absorbs the (infeed) force exerted on the component 21 by the spindle 11 in the (negative) direction of the Z axis. At least in the area of the ends, the melt pool support 25 may be slightly curved or rounded in order to avoid impressions of the melt pool support 25 on the underside of the component 21 facing away from the tool 17.

The linear guide 23 comprises a base part 27 and a slide 29, the base part 27 being connected to the frame 4 and the slide 29 being movable relatively to the base part 27. The linear guide 23 allows a relative movement between the slide 29 and the base part 27 in the (feed) direction (Z axis). The position of the slide 29 can optionally be determined by a travel measuring system 24.

The linear guide 23 can be designed such that it guides the melt pool support 25 along a straight or curved, in particular circular arc-shaped line between two end positions. Both are linear guides within the meaning of the invention, because the slide 29 has only one degree of freedom: It can only be moved back and forth in the direction of a straight or curved line between the end positions predetermined by the end stops.

If the slide 29 is designed as a circular segment (not shown), the slide 29 and the base part 27 move along a circular path, the center point of which is located on the counter-support side 4 in the extension of an axis of rotation of the spindle 11 or at least in the vicinity thereof.

In both embodiments, the relative movement between the slide 29 and the base part 27 is limited in both directions by a first end stop and a second end stop. The end stops are not shown for reasons of clarity.

In the illustrated embodiment, the melt pool support 25 of the counter support 19 is arranged directly on the slide 29. The slide 29 and the melt pool support 25 can also be integrated into one component.

In the embodiment shown, the base part 27 of the second linear guide 23 is rigidly connected to the base frame 3 and has no drive.

It is also possible for a drive to be provided to move the slide 25 back and forth in the direction of the X axis.

The counter support 19 according to the invention comprises restoring means (not shown), which can bring the slide 25 into the first end position illustrated in FIG. 2. The restoring means can be designed as a return spring or in the form of a drive.

For technological reasons, it is often advantageous if the axis of rotation of the spindle 11 does not strike or penetrate the surface of the component 21 at an angle of 90°. The deviation of this angle from 90° is referred to as the angle of approach a.

Such a non-zero angle of approach a can, as in conventional friction stir welding machines, be achieved by a tilt or an inclination of the spindle 11 by an angle of 0.5 to 5°.

However, for reasons of force flow and the symmetry and the stiffness of the tongs 1, it is particularly favorable if this inclination is realized (at least partially) on the counter-support side 5.

In FIGS. 3 to 5, various variants of the realization of an angle of approach a between the axis of rotation of the spindle 11 and the component 21 with the aid of the counter support 16 according to the invention are shown.

This can occur in particular in that the slide 29 is mounted so as to be inclined by the desired angle of approach a with respect to the feed direction (X axis). FIG. 3 shows an arrow representing the feed direction, and the angle of approach a is plotted.

In FIG. 3, the inclination of the component 21 is achieved in that a first wedge 33 is used between the lower part of the tongs and the guide slide of the (linear) guide. Of course, it is also possible to realize the desired inclination by a corresponding inclination of the underside of the base part 27 or an inclined contact surface of the base frame 3 (not shown). A separate wedge 33 has the advantage that it is easily replaceable so that the inclination of the slide 29 can be changed as needed.

Such variant has the further advantage that the distance between the tool 17 and the melt pool support 25 is at least approximately constant over the length of the individual stitch or partial weld seam so that it is not necessary to regulate or control the infeed movement of the first linear guide 15 during the welding process.

An alternative is shown in FIG. 4. In this version, a second wedge 35 is arranged between the slide 29 and the melt pool support 25. The advantage of this arrangement is that, due to the infeed force of the tool 17 and the inclination of the melt pool support 25, a force $F_{feed}$ acting in the feed direction (X axis) is produced.

$$F_{feed} = \sin e(a) * F_{infeed}$$

Where:
a: Angle of inclination or angle of approach
$F_{infeed}$: Infeed force of the spindle 11 in the direction of the Z axis.

The feed force $F_{feed}$ acts on the component 21 and thus reduces the feed force which may, where applicable, have to be applied by the industrial robot or a different handling system between the workpiece 21 and the device for friction stir welding.

FIG. 5 shows a further alternative which utilizes this effect even more strongly by using a second wedge 35 between the slide 29 and the melt pool support 25, the wedge angle of which is clearly increased beyond the desired angle of approach a; to 15° to 30°, for example.

The first wedge 33 inserted between the frame 3 and the base part 27 has a wedge angle that acts opposite the wedge angle of the second wedge 35 and is smaller than the wedge angle of the second wedge 35 by the magnitude of the angle of approach a. The difference between the two wedges 35, 33 results in the desired angle of approach a, which is generally in a range from 0.5° to 5°.

This situation can be expressed in formulaic terms as follows.

Angle of approach a=wedge angle b of second wedge 35–wedge angle c of first wedge 33.

As a result of the wedges 33, 35 arranged in opposite directions, the magnitude of the feed force $F_{feed}$ can be controlled via the wedge angle of the second wedge 35. For each joining process, the feed force can thus be adjusted as a function of properties of the component 21, the feed speed and/or other parameters.

The wedge angle b of the second wedge 35 may in particular be 4° to 45°, 5° to 20°, or 6° to 15°. The wedges 33 and 35 can be designed as separate components, but can also be integrated into the frame 3, the base part 29, the slide 19 or the melt pool support 25. FIGS. 3 to 5 serve to illustrate the features of claims 4 to 6.

While the tool 17 is still being advanced and the pin 18 penetrates into the component 21, a "swerving" movement of the melt pool support 25 in the feed direction (X axis), which is not desired at this time, occurs especially in the exemplary embodiments according to FIGS. 3 to 5 with an angle of approach a not equal to zero. It is therefore provided that a locking device 37 is provided on the counter support 19 and prevents the above-mentioned "swerving" movement until the infeed movement is completed and the tool 17 rests with its shoulder 20 on the component 21.

The locking device 37 is subsequently released and the feed movement begins.

FIG. 5 shows such a locking device 37 only schematically. The requirements for the locking device 37 are relatively low so that a detailed explanation of the mode of operation can be omitted.

After each partial welding process, when the melt pool support 25 and the slide 29 have reached the second end position, the melt pool support 25 and the slide 29, as already mentioned, are preferably brought into the first end position by a return spring 38 (see FIG. 5) or by other means.

In order to enable a relative movement between the component 21 and the melt pool support 25, the infeed force $F_{infeed}$ must be reduced so much that the static friction between the component 21 and the melt pool support 25 is greatly reduced or canceled, and the melt pool support 25 together with the slide 29 can virtually slide "under" the component 21 into the first end position. This is achieved in that the tool 17 and the spindle 11 perform a small movement opposite the infeed movement.

As an alternative to the locking device 37 and the return spring 38, a controllable (linear) drive can also be used to hold the melt pool support 25 at the start of the joining process at the desired position and to bring the melt pool support 25 from the second end position into the first end position after the joining process is completed. This allows further degrees of freedom in the process control but usually requires a larger installation space.

FIG. 6 schematically illustrates an exemplary embodiment of a counter support 19 according to the invention, with which the melt pool support 25 and slide 29 move on a circular path between the two end positions. A center point of the associated circle lies approximately in the extension of the axis of rotation of the spindle 11. With this embodiment, curved components 21 can also be joined. In comparison to the counter supports known from the prior art with rotatable rollers, this embodiment variant has the advantage that it is of a very compact design even if the component 21 is only very slightly curved and the radius of curvature is correspondingly large.

When a plane component 21 is joined, this embodiment has the advantage that the infeed force acting on the component 21 is concentrated on a small area in the immediate vicinity of the axis of rotation of the tool 17. Undesired deformations of the component 21 are also prevented.

Lastly, this geometry of a counter support 19 according to the invention enables the joining of a curved component 21 (such as car roofs or car doors; both not shown) without making a negative impression of the ends of the melt pool support 25 in the component 21.

The radius of curvature of the melt pool support 25 is less than or equal to the radius of curvature of the component 21 in the area of the weld seam.

In order to be able to weld components 21 with various local curvatures, it may be useful to use differently curved melt pool supports 25. Such melt pool supports can optionally be exchanged using an automatic changing system. For this purpose, the tongs 1 can, in particular on the counter-support side 4, have a magazine, a changer or another device which inserts the respectively mating counter support 19 into the tongs 1.

For guiding the slide 29 in the base part 27 of the counter support 19, various guide elements can be used.

In addition to a linear guide as a sliding bearing or rolling guide (recirculating ball guide, recirculating cylinder guide, etc.), curved guides, i.e., circular arc-shaped guides, can also be used. Hydrostatic or hydrodynamic or magnetic bearings can also be used.

In order to produce stitch seams that are not in a line but are curved, the counter support 19 must be rotatable so that the slide 27 is oriented in the feed direction for the following partial welding process. This can take place on the one hand by rotating the entire welding tongs 1 relatively to the firmly clamped component. Alternatively, only the counter support 19 can be rotated for this purpose.

This is preferably done in the unloaded state; i.e., between or before the individual stitch seams.

For this purpose, a rotating unit 39 can be arranged between the guide means 23 and the base frame 3. Such a configuration is schematically illustrated in FIG. 7. It comprises a base part 41 and a rotary disk 42. The rotary disk 42 is rotatably mounted in the base part 41 and can be rotated manually or by means of a drive (not shown) as needed. As a result of this rotation, the stitch weld seam also changes its direction. Through a plurality of such changes in direction, nearly arbitrarily curved weld seams can be produced.

The rotating unit 39 for rotating the counter support can allow continuous angles or only discrete angles; for example, in a fixed 15°, 30°, or 45° grid.

The rotating unit 39 preferably has a drive with which the rotational movement can be carried out.

FIG. 8 schematically shows a further exemplary embodiment of a counter support 19 according to the invention. The counter support comprises a base part 27 and a control lever 53 which is rotatably mounted on the base part 27 by means of a bearing 54.

The rotational movement of the control lever 53 relative to the base part 27 is limited by two end stops 55. The return spring 38 moves the control lever 53 into the first end position. The melt pool support 25 is arranged at an end of the control lever 53 opposite the bearing 54. Said melt pool support has a circular or involute-shaped contour.

The radius of this circular contour corresponds in a first approximation to the length of the control lever 53. However, it is possible and also shown in FIG. 8 that the center point of the radius of curvature of the melt pool support 25 does not coincide with the pivot point of the bearing 54, but is arranged laterally thereto. The center point of the melt pool support 25 is indicated in FIG. 8 by a point with reference symbol 57.

This results in a similar effect as the inclination of the melt pool support 25 according to FIGS. 3 to 5. In other words: The feed force required for joining the component 21 is reduced.

FIG. 9 schematically shows a further exemplary embodiment of a counter support 19 according to the invention. The counter support 19 has a plurality of control levers 53 which are arranged in parallel to one another and which connect a base part 27 and an upper part 47 to one another in an articulated manner. The control levers 53 are oriented such that they enclose an angle of slightly less than 90°, preferably between 85° and 60°, with the feed direction (X axis). The bearings 57 between the control levers 53 and the upper part 47 on the one hand and the base part 27 on the other hand are designed as flexure hinges in this exemplary embodiment. However, they can also be designed as conventional sliding bearings or rolling bearings.

As in the other exemplary embodiments as well, the feed direction is indicated by an arrow. This counter support 19 functions as follows:

Due to the infeed force $F_{infeed}$ and the resulting static friction, the upper part 47 does not move relatively to the component 21 during the feed movement, while the base part 27 firmly connected to the frame 3 moves relatively to the component 21.

As a result, the control levers 53 are elastically deformed (flexure hinge) and the upper part 47 moves on a circular path predetermined by the control levers 53. Before the control levers 53 are permanently deformed, the feed movement is interrupted and the infeed force $F_{infeed}$ is reduced so that the upper part 47 springs back into the first end position. This process subsequently begins anew. Based on their elasticity and the flexure hinges 57, the control levers 53 assume the functions of the guide means and a return spring 38 in this exemplary embodiment.

In this exemplary embodiment, a single stitch seam is a few millimeters long or even significantly shorter, up to less than one millimeter. It is then particularly advantageous if the pin 18 remains in the end crater while the spindle 11 continues to rotate. In this case, the axial force acts in particular in a pulsating manner with a frequency between 0.1 Hertz to 100 Hertz, in order to very quickly string together a high number of micro-stitch seams without interruption. Only the relief of load of the tool, and thus of the contact between the workpiece and the counter support, is required for the upper part 47 to spring back. The individual seams merge into one another so smoothly that the tongs can be moved virtually continuously.

In this embodiment variant, it is particularly advantageous if a tool 17 is used with a pin 18 of a conical shape. Due to the conical shape, even a slight retraction (movement opposite to the infeed direction) of the tool or at least of the pin of a few tenths of a millimeter is sufficient in order to convert the force fit between the tool and the workpiece into a positive fit. The positive fit is sufficient for positioning the tool relatively to the workpiece. During the phase of the form fit, the positioning of the counter support, the melt pool support or the workpiece relative to one another can then be changed due to the lack of infeed forces and feed forces.

FIG. 10 shows friction stir welding tongs 1 according to the invention and an industrial robot 31. The tongs 1 and the industrial robot 31 are detachably connected to one another via the mechanical interface 7. The component to be joined is not shown in FIG. 10.

It is particularly convenient to move the tongs 1 or the component 21 to be welded during the welding process using an industrial robot which has at least four, preferably five degrees of freedom or four or five articulated joints or axes.

The tongs 1 can thus be brought to any position and oriented according to the direction of the normal of the metal sheet.

The friction stir welding process according to the invention is explained by way of example with reference to FIG. 11.

In this case, tongs 1 according to FIGS. 1 and 2 are used. For reasons of clarity, not all components are provided with reference symbols.

Regarding a): The component(s) 21 are positioned in the tongs so that the tool 17 is above the point on the component 21 where the weld seam is to begin.

The second linear guide 23 is preferably located in a first end position so that the melt pool support 25 of the counter support 19 can move with the component 21 during the friction welding process until the second linear guide 23 has reached its second end position (see c).

Given that the melt pool support 25 and the component 21 do not move relatively to one another during the welding process, the direction of the weld seam is predetermined by the orientation of the second linear guide 23 (here, the Z axis).

In a second step b), the tongs 1 are closed in that the first linear guide 15 moves the spindle 1 and with it the pin 18 of the rotating tool 17 so far in the direction of the X axis until the pin 18 has penetrated into the component 21 and the tool shoulder 20 rests on the component 21.

This situation is shown in FIG. 11 b). As already explained, it is also possible to connect the spindle 11 firmly to the base frame and to arrange the first linear guide 21 with an actuator between the counter support 19 and the base frame 3.

The actual joining process now takes place by a relative movement between the tongs 1 and their tool 17 on the one hand and the component 21 on the other hand. Such relative movement is carried out in the exemplary embodiment explained with reference to FIG. 11 by a robot (not shown), which carries the tongs 1.

From the comparison of the positions of the melt pool support 25 in FIGS. 11 b) and c), such relative movement can be recognized. The weld seam is equally long but not visible.

The melt pool support 25 and the component 21 do not move relatively to one another.

The length of the weld seam is limited by the length of the travel path of the second linear guide 23.

As a result, the first step ends, or the first "short weld seam" is produced. After the welding movement, the tool 17 and the counter support 19 are slightly "pulled apart" so that the contact force between the melt pool support 25 and the component 21 is greatly reduced or ideally goes back to zero. This situation is shown in FIG. 11 d). For this purpose, the (rotating or non-rotating) tool 17 can optionally remain with its pin 18 in the end crater of the weld seam, and only the counter support 23 or its melt pool support 25 is returned to the starting position.

If the tongs 1 are opened to such an extent that the pin 18 no longer remains in the component 21, the pin 18 dips into the component 21 again, preferably precisely into the end crater of the preceding joining process, when the tongs 1 are closed. This reduces the wear of the tool 17 and considerably reduces the process time. Moreover, a "neater" weld seam results. Alternatively, it is also possible to use a tool 17 with a pin 18 of a conical shape. Due to the conical shape, even a slight retraction (movement opposite to the infeed direction) of the tool 17 or at least of the pin 18 of a few tenths of a millimeter is sufficient in order to convert the force fit between the tool and the workpiece into a positive fit. The positive fit is sufficient for positioning the tool relatively to the workpiece. During the phase of the form fit, the positioning of the counter support, the melt pool support or the workpiece relative to one another can then be changed due to the lack of infeed and feed forces.

Given the reduction of the contact force between the melt pool support 25 and 21, the melt pool support 25 can be moved from the second end position (see FIG. 11 d)) to the first end position (see FIG. 11 e)) without the component 21 changing its position relative to the tool 17.

As a result of the return movement of the melt pool support 25, a relative movement between the component and the melt pool support 25 thus takes place.

The positions of the melt pool support 25 shown in FIGS. 11 b) and 11 e) are the same.

In order to bring the melt pool support 25 from the second end position into the first end position, only a small force is required. A return spring (not shown) is sufficient for this purpose. Alternatively, a simple linear drive can also be provided.

The next short weld seam(s) can follow directly.

For this purpose, it is necessary to re-close the tongs 1 to such an extent that the tool shoulder 20 rests on the component 21 again (see FIG. 11 f)).

The joining process of the second short weld seam again takes place by a relative movement between the tongs 1 and their tool 17 on the one hand and the component 21 on the other hand (see FIG. 11 e)).

This step corresponds to creating the first short weld seam (see FIG. 11 c)).

The tongs are again moved relatively to the workpiece (FIG. 3g), as a result of which a stitch seam is again produced.

Steps a-g can be repeated as often as desired in order to realize correspondingly long seams as a series of (short) stitch seams.

Aluminum can in particular be welded to aluminum, steel, copper and magnesium.

The workpieces to be welded are preferably clamped during the welding process so that they approximately keep their position under the influence of the tool and the welding process.

A particularly favorable form of process control provides that during the dipping process in FIG. 11 b, the rotational speed of the tool 17 or the spindle 11 is at least temporarily higher than during the travel phase for producing the short weld seam. As a result of the higher rotational speed during the dipping process, a higher dipping speed and thus a shorter process duration and/or less wear of the tool, a lower process force than during the feed movement and/or less burr formation at the workpiece or a neater weld seam at the starting point can be achieved. The dipping movement can take place in a path-controlled or speed-controlled or regulated manner, with a constant or predetermined dipping force, or even by a combination of both.

In addition, the rotational speed at the beginning of the welding phase can be lowered briefly, and in return the infeed force can be increased in order to avoid dipping the tool 17 too deep into the component(s) 21. In the case of very simple counter supports which are in particular only equipped with a return spring in particular with a non-linear relationship of restoring force and path, this allows an effective overpressure on the spring in order to thus trigger the feed movement previously blocked by the return spring.

With the device according to the invention and the method according to the invention, short stitch seams in comparison to the component size are welded, for example with a maximum length of 3, 5, 7, or 15 cm, while the component has a size of at least 30 cm, in particular 70, preferably more than 150 cm as the main dimension. (Otherwise, the travel path of the welding machines is usually larger than the component.)

The surface of the melt pool support 25 should preferably be wear-resistant, hard and diffusion-resistant with aluminum at approximately 600° C. Ceramic, zirconium oxide, silicon nitride, silicon carbide, refractory metals, such as tungsten, and hard metals are therefore suitable.

Since the melt pool support 25 is subject to some wear, it should be easily exchangeable, for example by inserts inserted into the slide 29 in a form-fitting manner.

The width of the melt pool support 25 (i.e., in the direction of the Y axis; see FIG. 1) is approximately 0.8 to 1.5 times, in some applications up to 3 times, the diameter of the shoulder 20 of the friction stir welding tool 17.

LIST OF REFERENCE SYMBOLS

1 Friction stir welding tongs
3 Frame
4 Tool side
5 Counter-support side
7 (Mechanical) interface
8 Force measuring device
9 Free space
11 Spindle
13 Drive
14 Force measuring device
15 First linear guide
16 Displacement measuring device
17 Tool
18 Pin
19 Counter support
20 Shoulder
21 Component
23 Second linear guide
24 Displacement measuring system
25 Melt pool support
27 Base part
29 Slide
31 Industrial robot
33 First wedge
35 Second wedge
37 Locking device
39 Rotating unit
41 Base part
42 Rotary disk
43 Parallelogram structure
45 Lower part
47 Upper part
49 Support surface of lower part 45
51 Upper side 51 of upper part 47
53 Control lever
54 Bearing
55 End stop
57 Center point of the melt pool support 25
59 Support

The invention claimed is:

1. Method for friction stir welding using a device having a frame (3), a driven spindle (11) for receiving a tool (17) for friction stir welding and a counter support (19) including a base part (27) and melt pool support (25), wherein guide means with one degree of freedom are arranged between the melt pool support (25) and the base part (27) and allow a movement of the melt pool support (25) which is limited by two end positions and relative to the base part (27), the counter support (19) having restoring means in order to bring the melt pool support (25) into a first end position as needed, the method comprising the steps of:
 a) positioning the melt pool support (25) in a first position,
 b) advancing the tool (17) and/or the counter support (19) until a predetermined contact force ($F_A$) between the tool (17) and the melt pool support (25) is reached,
 c) carrying out a feed movement of the tool (17) and the counter support (19) relative to a component (21) until the melt pool support (25) has reached a second position,
 d) reducing the predetermined contact force ($F_A$) between the tool (17) and the melt pool support (25),
 e) moving the melt pool support (25) relatively to the component (21) into the first position, and
 f) increasing the contact force ($F_A$) between the tool (17) and the melt pool support (25) to the predetermined contact force ($F_A$).

2. Method according to claim 1, characterized in that the method comprises carrying out steps c) and d) and steps e) and f) several times in succession.

3. Method according to claim 1, characterized in that the method comprises rotating the melt pool support (25) about the axis of rotation of the tool (17) between steps d) and f).

4. Method according to claim 1, characterized in that the method comprises, at least temporarily during step (b), driving the tool with a higher rotational speed and/or infeed force than during the feed movement (step c).

5. Method according to claim 1, characterized in that the method comprises handling the device and/or the component (21) by a robot with at least 4 degrees of freedom.

6. Method according to claim 1, characterized in that the method comprises moving the device relative to the component (21) by a robot during the feed movement.

7. Method according to claim 1, characterized in that the force or infeed force exerted by the tool on components during the process steps b) or c) is greater than the force exerted by the handling system or robot at the interface 7 between the robot and the device; and the bending moment or torque generated by the infeed force with respect to the interface 7 is greater than the moment exerted by the robot at the interface 7 during the process steps b or c.

8. Method according to claim 1, characterized in that the method comprises manually guiding the component (21) by a machine operator using a holding or guiding device.

* * * * *